Oct. 22, 1929.                     C. CREWS                        1,732,261
                                BATTERY TERMINAL
                              Filed Sept. 19, 1928
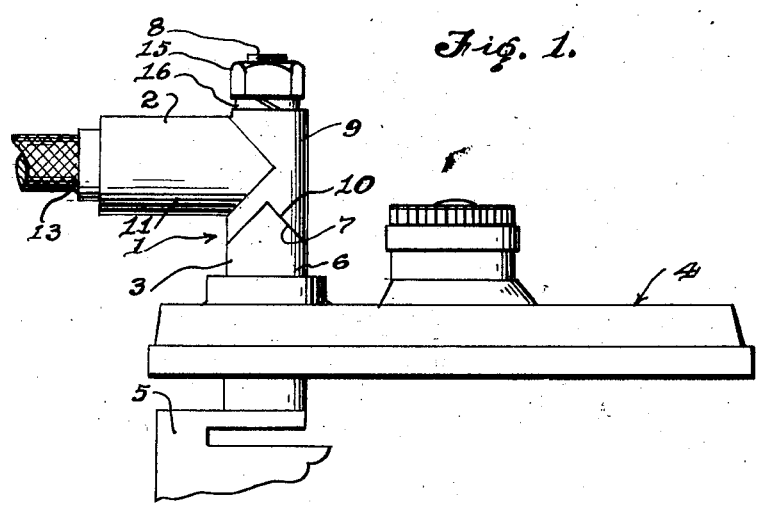
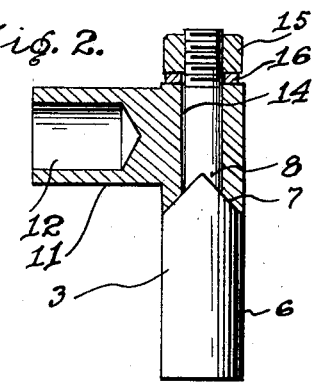
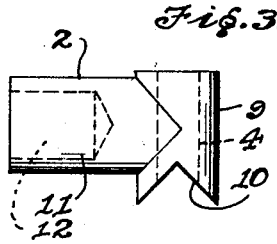
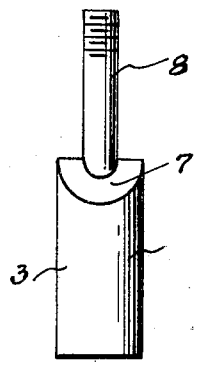
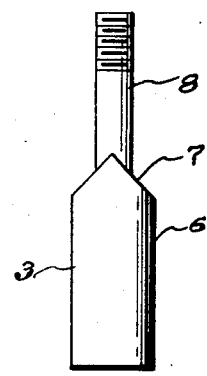
INVENTOR.
Cecil Crews
BY
J. Kaplan
ATTORNEY.

Patented Oct. 22, 1929

1,732,261

UNITED STATES PATENT OFFICE

CECIL CREWS, OF CHARLESTON, WEST VIRGINIA

BATTERY TERMINAL

Application filed September 19, 1928. Serial No. 306,902.

This invention relates to battery terminals for electric storage batteries and more particularly to the means for attaching the cable socket to the terminal post. As illustrated herein its application is to a standard form of battery used in automobiles. However it is not intended to limit the invention to this specific use as the terminal can be used on other types of batteries as well.

The need for this improvement arises from the fact that at present when the usual cable socket is attached to the terminal post there is a tendency for the cable socket to turn radially from its right position when the nut or screw is applied. Thus when the two members are fastened together it is necessary to use an auxiliary wrench to prevent the cable socket from turning when the fastening nut is screwed in place. This condition makes the replacement of cable sockets unhandy and troublesome especially where the space for the battery is limited as in motor vehicles. To overcome this situation means are provided to lock the cable socket and terminal post together in a manner which will prevent one turning on the other as the two members are fastened together and also to prevent any radial displacement should the fastening nut accidently become loose due to the vibration of the motor vehicle.

Another object of the invention is to provide a terminal post having a V-shaped notch which co-operates with a wedge shaped end of the cable socket for the purpose of locking the said post and socket together for preventing any radial motion in relation to each other.

Other objects will appear as the disclosure progresses. The drawings are intended merely to indicate a possible embodiment of the invention. It is obvious therefore that the actual needs of manufacture may necessitate certain mechanical changes. It is therefore not intended to limit the invention to the embodiment illustrated but rather to define such limits in the appended claims.

For a more detailed understanding of the invention attention is now called to the drawings in which a preferred embodiment is shown illustrated. In these drawings like parts are designated by like reference characters in all the views.

In the drawings:

Figure 1 is a view of the battery terminal shown attached to a battery cover.

Figure 2 is a detached view of the battery terminal partly in section.

Figure 3 is a detached view of the cable socket.

Figure 4 is a detached view of the terminal post.

Figure 5 is a detached view of the terminal post taken at right angles to the view shown in Figure 4.

Referring now to the drawings in detail numeral 1 designates the battery terminal composed of a cable socket 2 and a terminal post 3 attached to the usual battery cover 4. Fastened to the end of the terminal post is the usual grid 5.

The terminal post 3 is formed of a cylinder body portion 6 wedge shaped at the upper end as at 7 and with a threaded rod 8 extending from the wedge shaped end.

The cable socket is formed of a body portion 9 having a notch 10 at the bottom which fits over the wedge shaped end 7 of the terminal post for a purpose to be later described, and with an extension 11 having a socket 12 into which is soldered or fastened by any suitable means the usual cable 13. Passing through the body portion of the cable socket is a hole 14 into which fits the threaded rod 8 when the cable socket and terminal post are attached together.

For firmly holding the cable socket and terminal post together a nut 15 is provided which threadedly engages with the upper end of the terminal post. Numeral 16 designates a lock washer placed between the nut and cable socket.

It will be seen that when the cable socket is placed over the terminal post the notch 10 will fit over the wedge shaped end 7 and lock the two members together against any radial rotation in relation to each other. When the nut 15 is screwed tight any tendency to torsional rotation of the cable socket will be prevented.

It will thus be seen that I have provided a simple, relatively cheap and efficient and easily applied form of cable terminal. Any tendency of the cable socket to turn on its axis when being applied or when accidently jarred loose will be prevented due to the locking together of the wedge and notch portions 7 and 10. Also a more efficient electrical contact is formed between the cable socket and terminal post due to the increased area of the surface contact between the wedge and notch construction than can be had otherwise by the usual type of terminal. In tight places where space is limited this device is especially useful and advantageous as only one wrench can be used to connect the cable socket in place of using two wrenches as is now necessary.

Having described my invention, I claim:

1. The combination of a battery post having a wedge-shaped formation at the top thereof and a threaded element projecting from said wedge-shaped formation, a connector provided with a cable socket having an inverted V-shaped scarf at the bottom and a bore intersecting said scarf, the said threaded element of said post projecting into and through said bore, the scarfed surface of the connector and the wedge surface of the post engaging each other, a nut threaded on said threaded element to lock the connector to the post, the scarf and wedge formation preventing said parts from rotating in respect to each other when the parts are in locked position.

2. The combination of a battery terminal post and a cable connector, the upper portion of said terminal post being wedge-shaped, a threaded rod extending from said wedge-shaped surface, said cable connector having a hole which fits over said threaded rod, the lower end of said cable connector having a V-shaped notch which fits over the wedge-shaped portion of said terminal post, means for attaching a cable to said connector and means to fasten the connector and terminal post together, the said notch and wedge formations preventing rotation of the parts when they are locked together.

In testimony whereof I affix my signature.

CECIL CREWS.